United States Patent
Xia et al.

(10) Patent No.: US 9,098,729 B2
(45) Date of Patent: Aug. 4, 2015

(54) METHOD AND APPARATUS FOR DETECTING DEVICE INTRUSION TO A NETWORK INTERFACE TERMINAL

(71) Applicants: Juan Xia, Shanghai (CN); Yangong Zhu, Shanghai (CN); Weimin Yu, Shanghai (CN)

(72) Inventors: Juan Xia, Shanghai (CN); Yangong Zhu, Shanghai (CN); Weimin Yu, Shanghai (CN)

(73) Assignee: Tellabs Operations INC., Naperville, IL (US)

( * ) Notice: Subject to any disclaimer, the term of this patent is extended or adjusted under 35 U.S.C. 154(b) by 140 days.

(21) Appl. No.: 13/912,132

(22) Filed: Jun. 6, 2013

(65) Prior Publication Data

US 2014/0366163 A1    Dec. 11, 2014

(51) Int. Cl.
*H02G 3/14* (2006.01)
*G06F 21/86* (2013.01)
*H02G 3/08* (2006.01)

(52) U.S. Cl.
CPC ............... *G06F 21/86* (2013.01); *H02G 3/14* (2013.01); *H02G 3/081* (2013.01)

(58) Field of Classification Search
CPC ........... H02G 3/14; H02G 3/081; G06F 21/86
USPC ..................................................... 174/66, 67
See application file for complete search history.

(56) References Cited

U.S. PATENT DOCUMENTS

2014/0367136 A1 * 12/2014 Trojanowski ............... 174/66

OTHER PUBLICATIONS www.ck-components.com. "Snap-acting Production Selection Guide".
www.ck-components.com. "Product Specification", Rev. B., Aug. 2010.

* cited by examiner

*Primary Examiner* — Ernest Unelus
(74) *Attorney, Agent, or Firm* — JW Law Group; James M. Wu

(57) ABSTRACT

A network interface terminal ("NIT") able to provide network service includes an intrusion shrapnel, elastic element, intrusion plate, and bolt is disclosed. The intrusion shrapnel, in one embodiment, has a cylindrical body with an opening through center of the cylindrical body. First and second discs are attached to each end of the cylindrical body. The elastic element, such as a spring, is situated between the first disc and a frame applying a force pulling the intrusion shrapnel in a disengaging direction. The intrusion plate which is electrically coupled to a PCB is situated adjacent to the second disc. The bolt having a helical ridge thread passes through the open of the cylindrical body and makes the second disc to electrically contact with the intrusion plate.

17 Claims, 13 Drawing Sheets

METHOD AND APPARATUS FOR DETECTING DEVICE INTRUSION TO A NETWORK INTERFACE TERMINAL

FIELD

The exemplary embodiment(s) of the present invention relates to network communications networks. More specifically, the exemplary embodiment(s) of the present invention relates to device intrusion to a network interface terminal ("NIT").

BACKGROUND

With increasing demand for more information with faster speed, network service providers are incorporating, switching, and/or upgrading conventional network equipments with higher capacity network technologies, such as optical devices. For example, to supply more information containing video, audio, and/or data, high-speed communications networks are generally more desirable. For example, optical communications networks, for instance, can typically provide high-speed audio, video, and/or data transmission with greater capacity between homes and enterprises.

Conventional optical network architecture generally includes fiber to the x ("FTTX") which may include fiber to the node/neighborhood ("FTTN"), fiber to the curb ("FTTC"), fiber to the building ("FTTB"), fiber to the home ("FTTH") or other edge location to which a fiber network extends. Fiber to the premises ("FTTP"), for example, is a form of optical information delivery system in which an optical fiber is run directly onto customers' premises. FTTB, for example, is another example of providing optical signals to locations very close to the end user's living or office space.

To provide optical signals to a user's facility or home, a service provider(s) typically requires installing various optical network interface devices ("NIDs") such as optical network terminals ("ONTs") at users' premises. A problem associated with such installation at users' premises is that installed ONT is susceptible to intrusion and/or tampering.

A conventional approach to resolve the venerability of tampering is to use detecting switch to monitor intrusion. A problem associated with the convention approach is that the size of the switch is usually too big for typical NIDs, such as wall mountable outlets, or cubicle mountable outlets.

SUMMARY

The exemplary embodiment(s) of the present invention discloses a network interface terminal ("NIT") that has an intrusion shrapnel, elastic element, intrusion plate, and bolt. The intrusion shrapnel, in one embodiment, has a cylindrical body with an opening through the center of the cylindrical body. First and second discs are attached to each end of the cylindrical body. The elastic element, such as a spring, is situated between the first disc and a frame applying a force pulling the intrusion shrapnel into a disengaging direction. The intrusion plate which is electrically coupled to a printed circuit board ("PCB") is placed adjacent to the second disc. The bolt has a helical ridge thread passes through the opening of the cylindrical body and is used to force the second disc to make an electrically contact with the intrusion plate.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
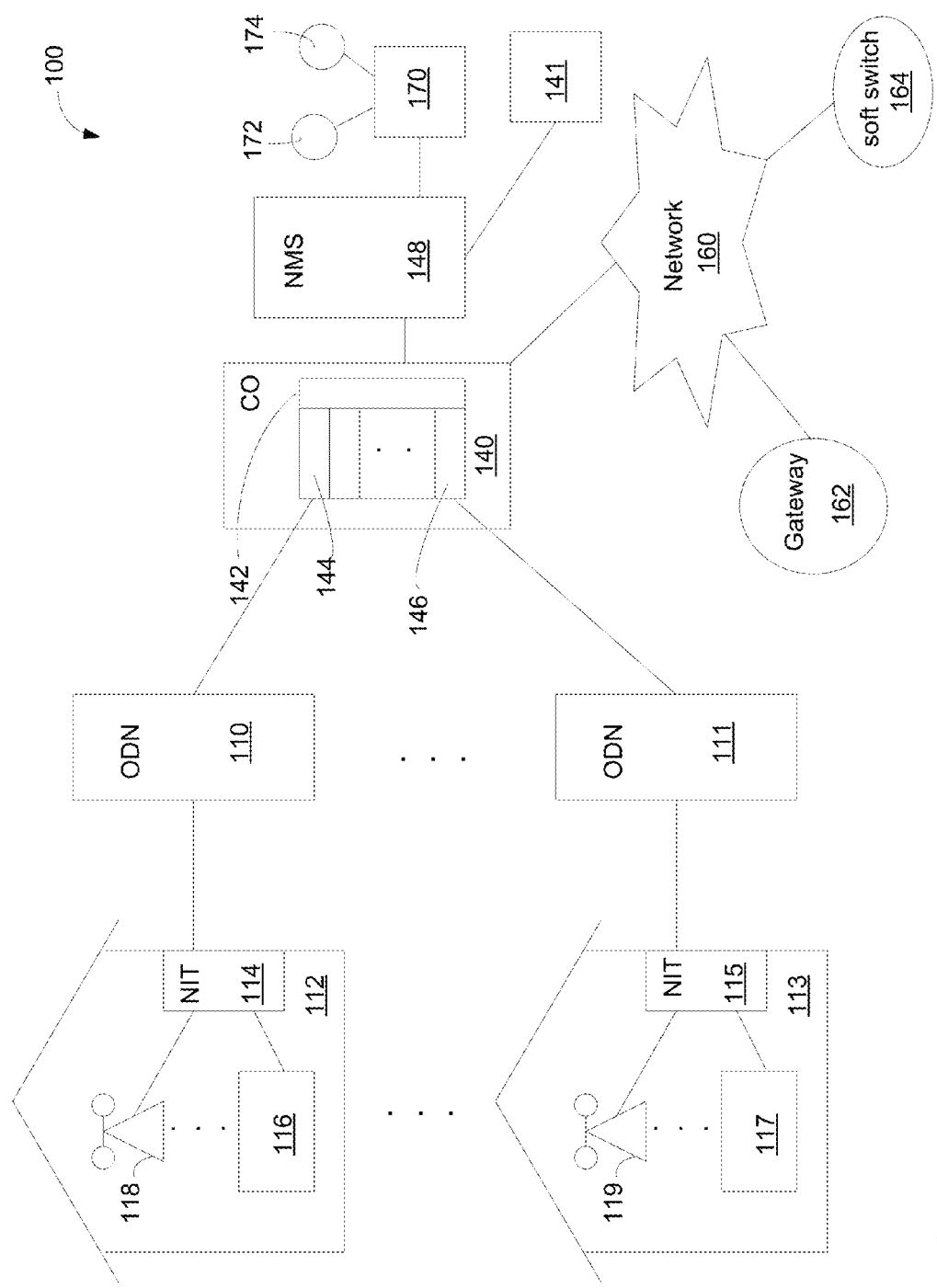
FIG. 1 is a block diagram illustrating a communications network including optical networks using a network interface terminal ("NIT") in accordance with one embodiment of the present invention.

Exemplary embodiment(s) of the present invention is described herein in the context of a method, system and apparatus for detecting device intrusion and/or tampering to a network interface terminal ("NIT").

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

The embodiment(s) of the present invention discloses a network interface terminal ("NIT") capable of monitoring and/or detecting outlet tampering at a relatively early stage. NIT includes an intrusion shrapnel, elastic element, intrusion plate, and bolt. The intrusion shrapnel, in one embodiment, is constructed to have a cylindrical body with an opening through the center of cylindrical body. First and second circular shaped discs are attached to each end of the cylindrical body. The elastic element, such as a spring, is situated between the first disc and a frame exerting a spring force pulling the intrusion shrapnel in a disengaging direction. The intrusion plate which is electrically coupled to a PCB is placed adjacent to the second disc. The bolt has a helical ridge thread passes through the opening of the cylindrical body and is used to force the second disc to make an electrically contact with the intrusion plate.

FIG. 1 is a block diagram illustrating a communications network including an optical network using NIT in accordance with one embodiment of the present invention. Network 100 illustrates a high-speed communications network configured to provide network services between users or premises 112-113 and/or 172-174. Note that the users can be, but not limited to, companies, enterprises, homes, service providers, content providers, and the like. Network 100, in one aspect, includes at least a portion of optical communication network. It should be noted that the underlying concept of the exemplary embodiment(s) of the present invention would not change if one or more blocks (or devices) were added to or removed from network 100.

An optical communications network, for example, can be a fiber to the premises ("FTTP") optical network architecture, which distributes optical signals from a central office 140 to one or more optical network terminals or optical network terminations ("ONTs") wherein the ONTs generally reside at customers' or users' premises 112-113. Network 100 further includes NMS 148, central offices 140-141, network connection 160, optical distribution networks ("ODNs") 110-111, and network interface terminal ("NIT") 114-115. Network connection 160 may be used to connect to a video network, wireless network, gateway device 162, and soft switch 164.

Central office 140, for example, includes an optical line termination ("OLT") 142. Each OLT 142 can support a group of passive optical networks ("PONs") 144-146. Each one of PONs 144-146 may be further coupled to one or more ODNs. Each ODN provides optical data transmission between a PON and a group of ONTs. A function of an ODN is to split a single optical fiber into multiple optical fibers. For example, PON 144 feeds a single optical fiber to ODN 110. ODN 110 subsequently splits the single optical fiber into multiple optical fibers feeding to multiple ONTs including ONT(s) at NIT 114 or 115. Alternatively, a PON could be configured to support more than 64 ONTs depending on the layout of optical network. NMS 148 is coupled to central offices 140-141, and a server 170. Server 170 is coupled to users or user's premises 172-174 wherein users, for instance, can be network operators, administrators, and/or other servers (or processing devices). A function of NMS 148 is to display network information to NMS clients.

NMS 148 is used to maintain and monitor a communications network. For example, NMS 148 provides functions for controlling, planning, allocating, deploying, coordinating, and monitoring the resources of a network, including performing functions, such as fault management, configuration management, accounting management, performance management, and security management ("FCAPS"). The fault management is configured to identify, correct and store faults that occur in an optical network. While the configuration management identifies, simplifies, and tracks the network configuration, the accounting management identifies and collects usage statistics for the customers or users. It should be noted that performance thresholds can trigger alarms and alerts. Security management maintains a process of controlling access to the network.

NIT 114, as shown in FIG. 1, is a stationary network connecting outlet physically situated at user's premise 112. In one example, NIT 114 can be a stationary network coupling device. NIT 114, in one embodiment, is an optical network terminal ("ONT") with a tampering warning system ("TWS"). TWS, in one aspect, is integrated into the circuitry performing functions of ONT. NIT 114, in one example, can be considered as wall-mountable ONT outlet. Alternatively, NIT 114 can be mounted cubicle raceway. An advantage of employing NIT is that it simplifies optical connection at the user premise.

Premise 112 may include additional communication devices (or equipments) such as voice device 118 and network device 116. While voice device 118 may be a wired or wireless voice device, device 116 may be a personal computer, server, set-top-box ("STB"), modem, or the like. A function of NIT is to convert signal format between optical signals and electrical signals. For instance, ONT at NIT 114 receives optical signals from a corresponding ODN 110 and subsequently converts the optical signals to electrical signals before the electrical signals are transmitted to devices 116 and 118. Similarly, the ONT at NIT 114 receives electrical signals from local devices 116 and/or 118, and then converts the electrical signals to optical signals before being transmitted to ODN 110. It should be noted that NIT 115 is coupled to local devices 117-119 at customer premise 113 and performs similar functions as NIT 114.

An advantage of using the exemplary embodiment(s) of NIT is that it simplifies access procedure to an optical network. Another advantage of using NIT is that it employs the TWS in NIT to provide warning or notification to user or network administrator when NIT is intruded, compromised, and/or tampered at a relatively early stage.

Figure 2:
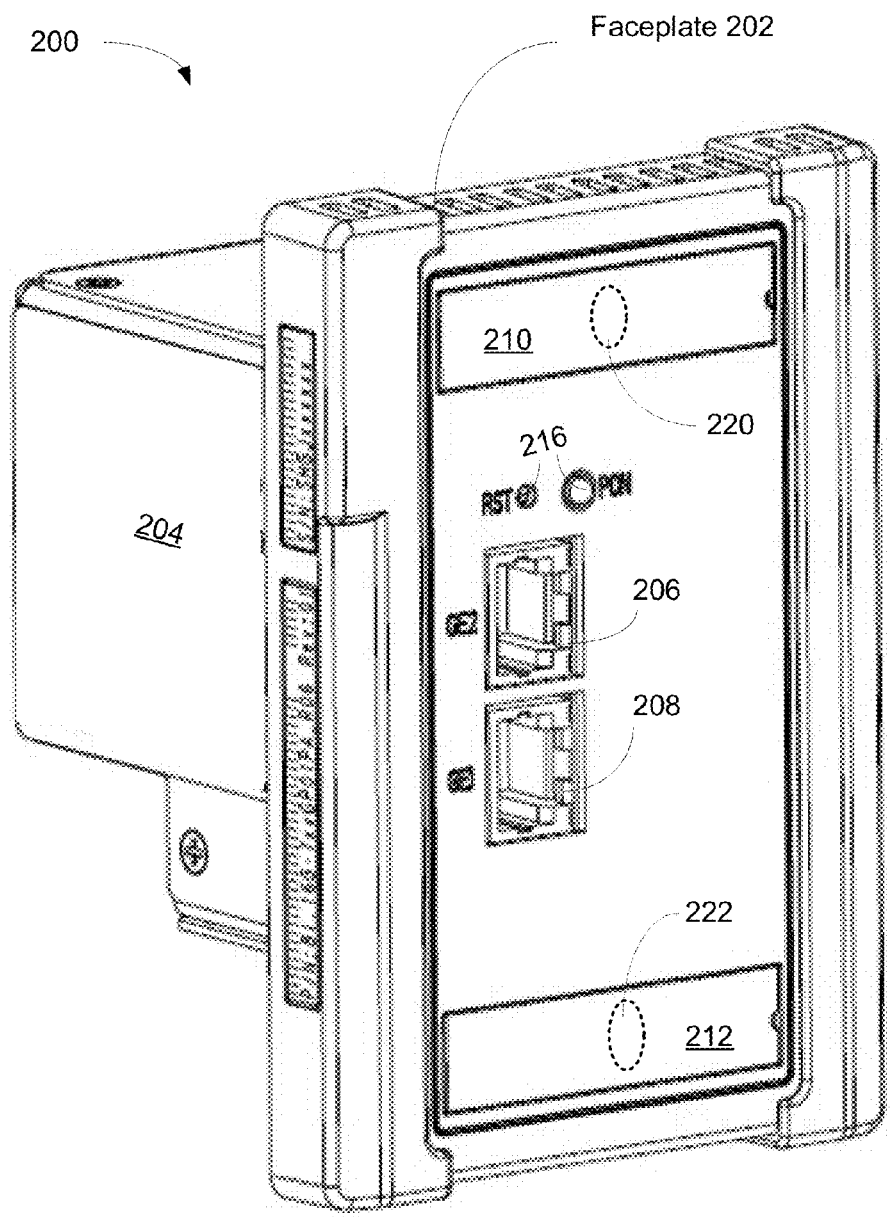
FIG. 2 is a diagram illustrating a physical structure of NIT including tampering warning system in accordance with one embodiment of the present invention.

FIG. 2 is a diagram illustrating a physical structure or configuration of NIT 200 including TWS in accordance with one embodiment of the present invention. NIT 200 includes a faceplate 202 and NIT body 204 wherein faceplate 202, in one aspect, includes sockets 206-208 and openings 210-212. Additional features such as status indicators 216 may be added to faceplate 202. The size of faceplate 202, in one example, is similar to the size of a traditional electrical power outlet(s). It should be noted that the underlying concept of the exemplary embodiment(s) of the present invention would not change if one or more elements were added to or removed from NIT 200.

At least one opening of faceplate 202 is a bolt opening such as opening 210, hereinafter referred to as bolt opening 210. Alternatively, bolt opening can be a circular hole 220 as indicated by a dotted circle for allowing a bolt to pass through. Similarly, a circular hole 222 can also be created in opening 212 as indicated by a dotted circle as a bolt opening. Depending on the applications, circular hole 220 or 222 can be located anywhere within opening 210 or 212. Bolt opening 210 allows a bolt, not shown in FIG. 2, to be inserted into bolt opening 210 to anchor NIT 200 to a wall or a solid surface. As the bolt tightens up against the wall via NIT body, the bolt also sets up or activates TWS which begins to operate.

Sockets 206-208, in one example, are Ethernet sockets capable of receiving Ethernet connectors, such as Cat 5 cable with RJ45 plug or Cat 6 with RJ45 plug. In one embodiment, a device, such as a laptop computer, desktop computer, server, printer, and the like, can directly connect to NIT 202 via network connectors and is able to access an optical network. It should be noted that the sockets can include a combination of connector standards including, for instance, optical connectors. In an alternative embodiment, faceplate 202 can be configured to receive wireless signals via WLAN (wireless local area network) or cellular networks.

NIT body 204, in one aspect, includes a chassis which is used to house various components including, but not limited to, PCB, TWS, power management, and optical network coupling device(s). PCB, in one embodiment, includes electrical and/or optical converter(s), signal receiver(s), packet forwarder(s) or transmitter(s), and/or TWS related components. NIT body 204 is constructed in a compact size thereby it can be fitted in between the wall(s) and/or cubicle raceway(s).

When NIT 200 is installed or anchored at a stationary location such as a wall or a cubicle raceway, TWS is activated to monitor potential unauthorized physical tampering or intrusion. When the bolt is being unscrewed or released from NIT 200 which begins to separate from the stationary location, TWS detects the unscrewing activity of the bolt and issues an alert or warning signal(s) to a predefined recipient such as network administrator or user. Alternatively, TWS can also be configured to stop or halt transmitting and/or converting signals whereby tampering information passing through NIT 200 can be reduced. TWS, in one embodiment, can also be configured to sound an alarm as soon as it detects an intrusion.

An advantage of using NIT 200 with TWS is that it prevents or reduces unauthorized intrusion of NIT 200.

Figure 3:
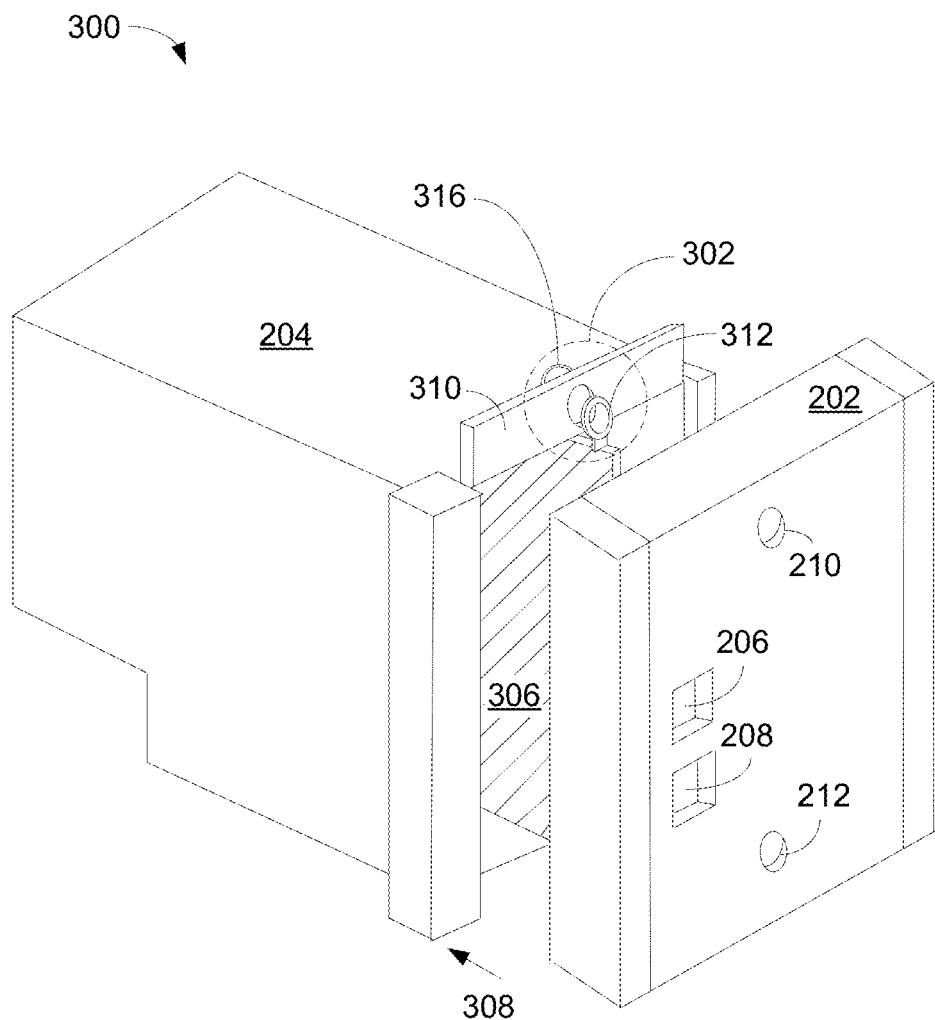
FIG. 3 is a diagram illustrating a NIT having a faceplate and a NIT body in accordance with one embodiment of the present invention.

FIG. 3 is a diagram illustrating NIT 300 which has faceplate 202 and NIT body 204 in accordance with one embodiment of the present invention. NIT 300 is similar to NIT 200, shown in FIG. 2, except that NIT body 204 is moved slightly away from faceplate 202 as indicated by arrow 308. NIT 300 illustrates a TWS trigger assembly 302 which, in one embodiment, includes frame 310, intrusion plate 312, and intrusion shrapnel 316, wherein intrusion plate 312 is further coupled to PCB 306.

When TWS is activated, a current or triggering current, in one example, will flow from TWS circuits located on PCB 306 to intrusion plate 312, and the triggering current continues traveling from intrusion plate 312 to frame 310 via intrusion shrapnel 316. For example, once NIT body and faceplate 202 are engaged or enclosed, TWS is activated wherein the flow of triggering current continues. When, however, the flow of triggering current stops, TWS triggers an alert or warning signal(s). It should be noted that the reason for not flowing of triggering current may include, but not limited to, outlet tampering, unauthorized intrusion, or physical damage to NIT.

Figure 4:
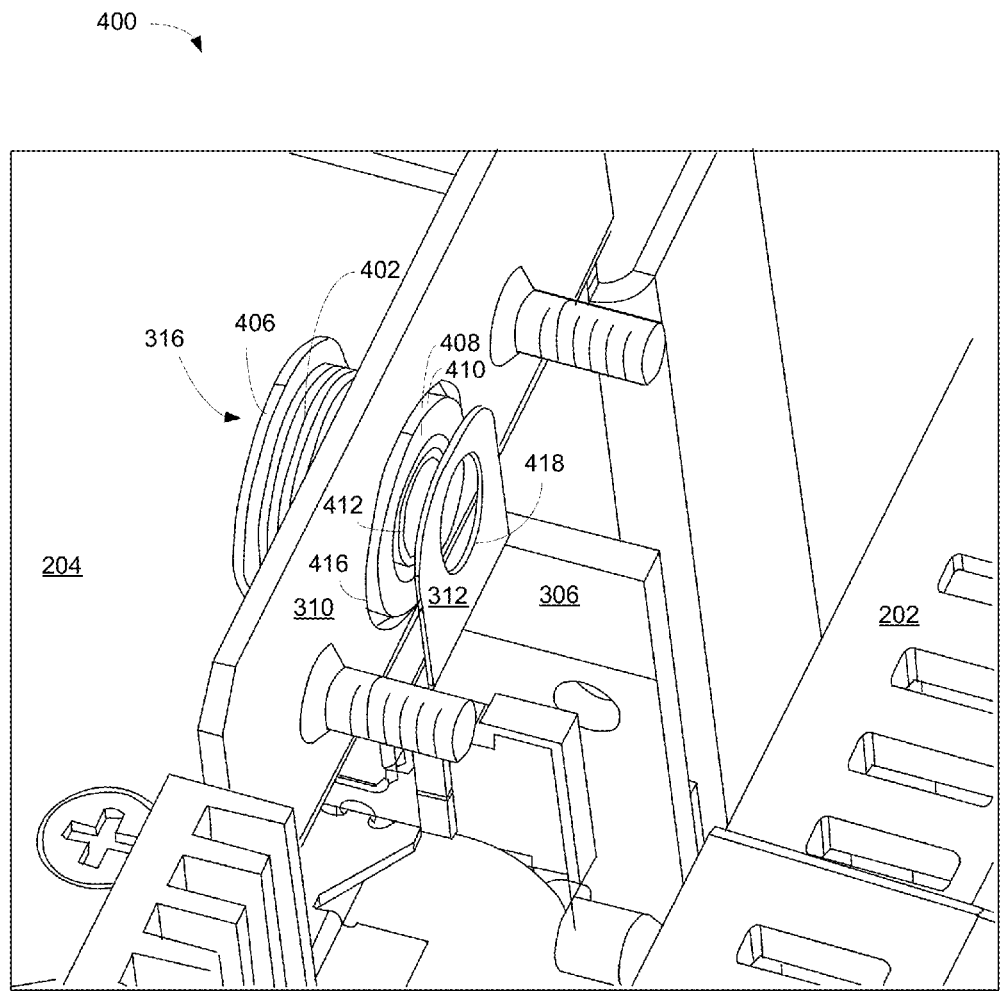
FIG. 4 is a perspective diagram illustrating internal structure of TWS trigger assembly in accordance with one embodiment of the present invention.

FIG. 4 is a perspective diagram 400 illustrating structure of TWS trigger assembly in accordance with one embodiment of the present invention. TWS trigger assembly includes intrusion shrapnel 316 and elastic element 402 wherein elastic element 402, in one example, is a spring. Intrusion shrapnel 316, in one embodiment, includes a cylindrical body 410 with opening 412. Cylindrical body 410 includes a first disc or circular shaped disc 406 and a second disc 408, wherein discs 406-408 are situated at the two ends of cylindrical body 410.

Frame 310, which can be an extension of NIT body 204 as part of chassis, includes a hole 416, wherein hole 416 is configured to have sufficient size to allow a part of cylindrical body 410. Hole 416 is further configured to be smaller than diameter of spring 402 whereby it prevents spring 402 to go through. Spring 402 is placed outside of exterior surface of cylindrical body 410 between disc 406 and frame 310. Spring 402 or elastic element supplies a spring force to keep intrusion shrapnel 316 at a predefined distance from frame 310.

Opening 412, which may be threaded with helical ridge around the wall of opening 412, is aligned with hole 418 of intrusion plate 312. A bolt, not shown in FIG. 4, can be inserted from faceplate 202 through hole 418 and opening 412. A locknut, in one example, can be used with the bolt to fasten intrusion shrapnel 316 to intrusion plate 312 if opening 412 is not threaded. Alternatively, if opening 412 of intrusion shrapnel 316 is threaded, its thread can engage with the helical ridge thread on the surface of bolt to anchor intrusion shrapnel 316 to intrusion plate 312.

Figure 5A:
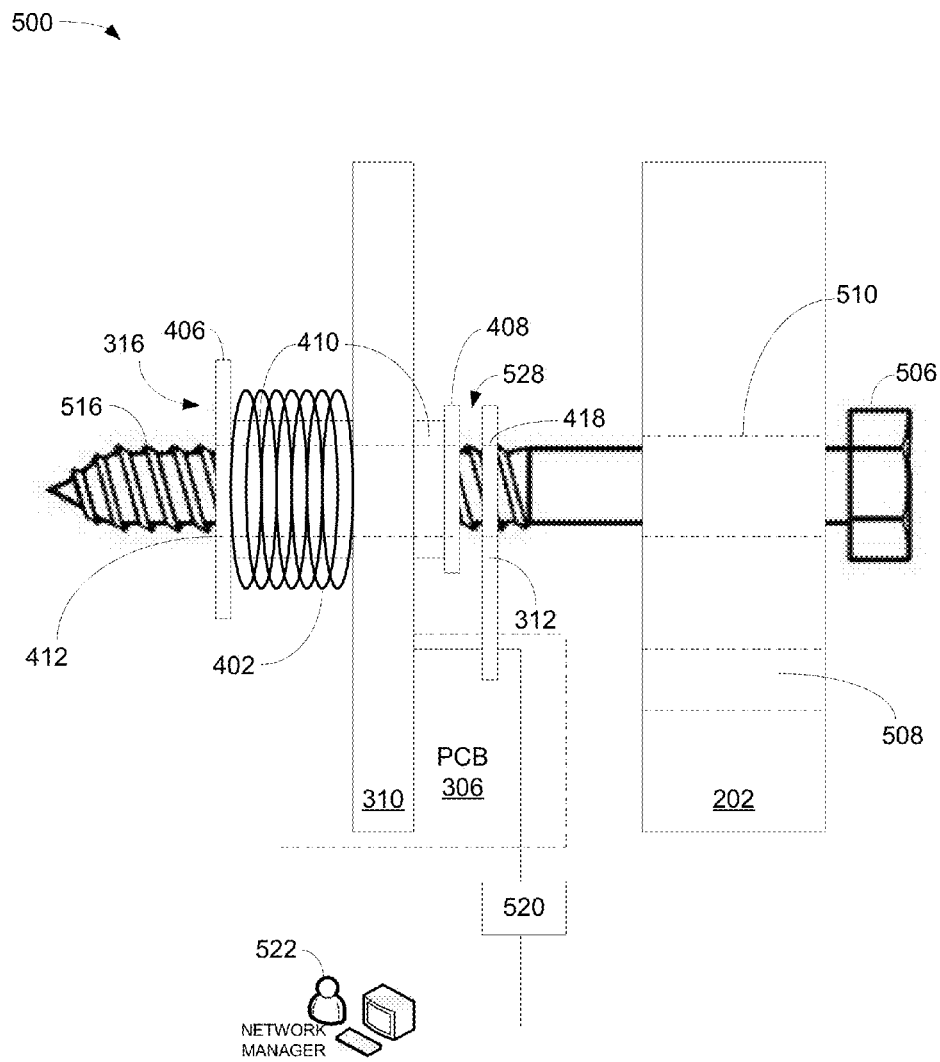
FIGS. 5A-C are block diagrams illustrating a tampering detecting mechanism operated by NIT in accordance with one embodiment of the present invention.

FIG. 5A is a block diagram 500 illustrating a tampering detecting mechanism operated by NIT in accordance with one embodiment of the present invention. Diagram 500 includes user 522, network device 520, faceplate 202, and NIT body containing a TWS trigger assembly wherein faceplate 202, in one aspect, includes bolt opening 510 and one or more sockets 508. It should be noted that the underlying concept of the exemplary embodiment(s) of the present invention would not change if one or more elements were added to or removed from diagram 500.

NIT, in one example, is a stationary network coupling device configured to include faceplate 202, intrusion shrapnel 316, elastic element 402, intrusion plate 312, and bolt 506. Faceplate 202 includes at least one bolt opening or hole 510 to receive bolt 506 and at least one Ethernet socket 508 capable of receiving an Ethernet cable with a connecting plug. Bolt opening 510 can also be threaded so that the thread can engage with the thread on bolt 506.

Intrusion shrapnel 316, in one embodiment, includes a cylindrical body 410 with an opening 412 through the center of cylindrical body 410. The first end of cylindrical body 410 is attached to a first disc 406 and a second end of cylindrical body 410 is attached to a second disc 408. It should be noted that discs 406-408 and cylindrical body 410 can be fabricated into a single component or device. Opening 412 of cylindrical body 410, in one embodiment, includes a helical ridge thread that coincide the helical ridge thread on bolt 506.

Elastic element 402 that is situated between disc 406 and frame 310 allows or limits intrusion shrapnel 316 to move within a limited distance. First disc 406 is configured to couple with elastic element 402 such as a spring and second disc 408 is configured to make electrical contact with intrusion plate 312. Elastic element or spring 402, in one aspect, is configured to fit outside of at least a portion of the exterior of cylindrical body 410 wherein one end of spring pushes against frame 310 and another end of spring pushes against first disc 406.

Intrusion plate 312 is electrically coupled to PCB 306 and situated adjacent to second disc 408. Note that intrusion plate 312 includes hole 418 that allows bolt 506 to pass through. In one embodiment, intrusion plate 312 is made of flexible electrical conductive material, such as aluminum and/or copper, capable of conducting electrical current.

Bolt 506, in one embodiment, contains helical ridge thread 516 and has a diameter that allows bolt 506 to pass through opening 510, opening 418, and 412 of cylindrical body 316. Intrusion plate 312 and second disc 408 are capable of making an electrically contact in response to the movement of bolt

506. For example, second disc 408 engages with intrusion plate 312 that allows a current to flow from intrusion plate 312 to second disc 408 when bolt 506 is in a tightened position which causes first disc 406 moves closer to frame 310. Also, second disc 408 can disengage from intrusion plate 312 leaving a gap 528 when bolt 506 is in a released position. Note that the released position causes first disc 406 moves away from frame 310 in response to spring force generated by elastic element 402.

NIT, in one embodiment, further includes PCB 306 and an optical cable coupled to PCB 306 for transmitting optical signals. PCB 306, in one embodiment, further includes optical component, network circuitry, and intrusion triggering circuitry. The network circuitry, in one example, converts between optical signals and electrical signals. The intrusion triggering circuitry, which may be connected to network manager or user 522 via a network device 520, is configured to issue an alert signal when second disc 408 disengages from intrusion plate 312.

Figure 5B:
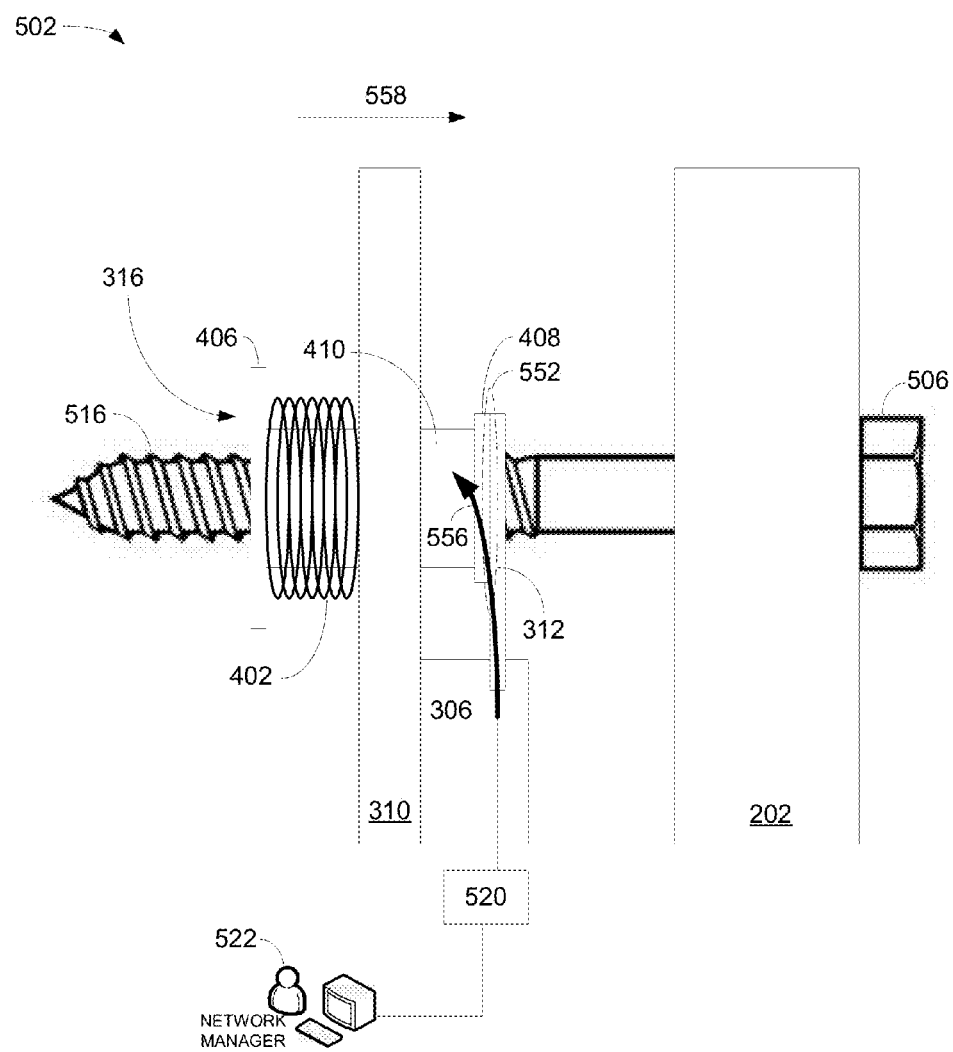

FIG. 5B is a block diagram 502 illustrating an installed NIT with an activated TWS trigger assembly in accordance with one embodiment of the present invention. Diagram 502, which is similar to diagram 500 shown in FIG. 5A, includes user 522, network device 520, faceplate 202, and NIT body. In one embodiment, the TWS trigger assembly, also known as tampering detector, includes intrusion shrapnel 316, intrusion plate 312, elastic element 402, frame 310, and bolt 506. It should be noted that the underlying concept of the exemplary embodiment(s) of the present invention would not change if one or more elements were added to or removed from diagram 502.

When bolt 506 is in a tightened position (shown in FIG. 5B), intrusion shrapnel 316 moves in a direction indicated by arrow 558 as bolt 506 turns in a tightening direction such as clockwise motion. As intrusion shrapnel 316 moves in a direction indicated by arrow 558, it moves closer to frame 310 or faceplate 202 as spring 402 becomes further compressed. Once bolt 506 is in a tightened position, the surface of second disc 408 becomes firmly in contact with the surface of intrusion plate 312 to form an engaged contact 552. Engaged contact 552 forms electrical as well as thermal contact capable of facilitating a current flow such as current 556. Current 556, in one aspect, flows from the intrusion triggering circuitry to frame 310 via a current path traveling from PCB 306, intrusion plate 312, and intrusion shrapnel 316. Note that current 556 could also be sent from network device 520 initiated by an administrator system 522.

Figure 5C:
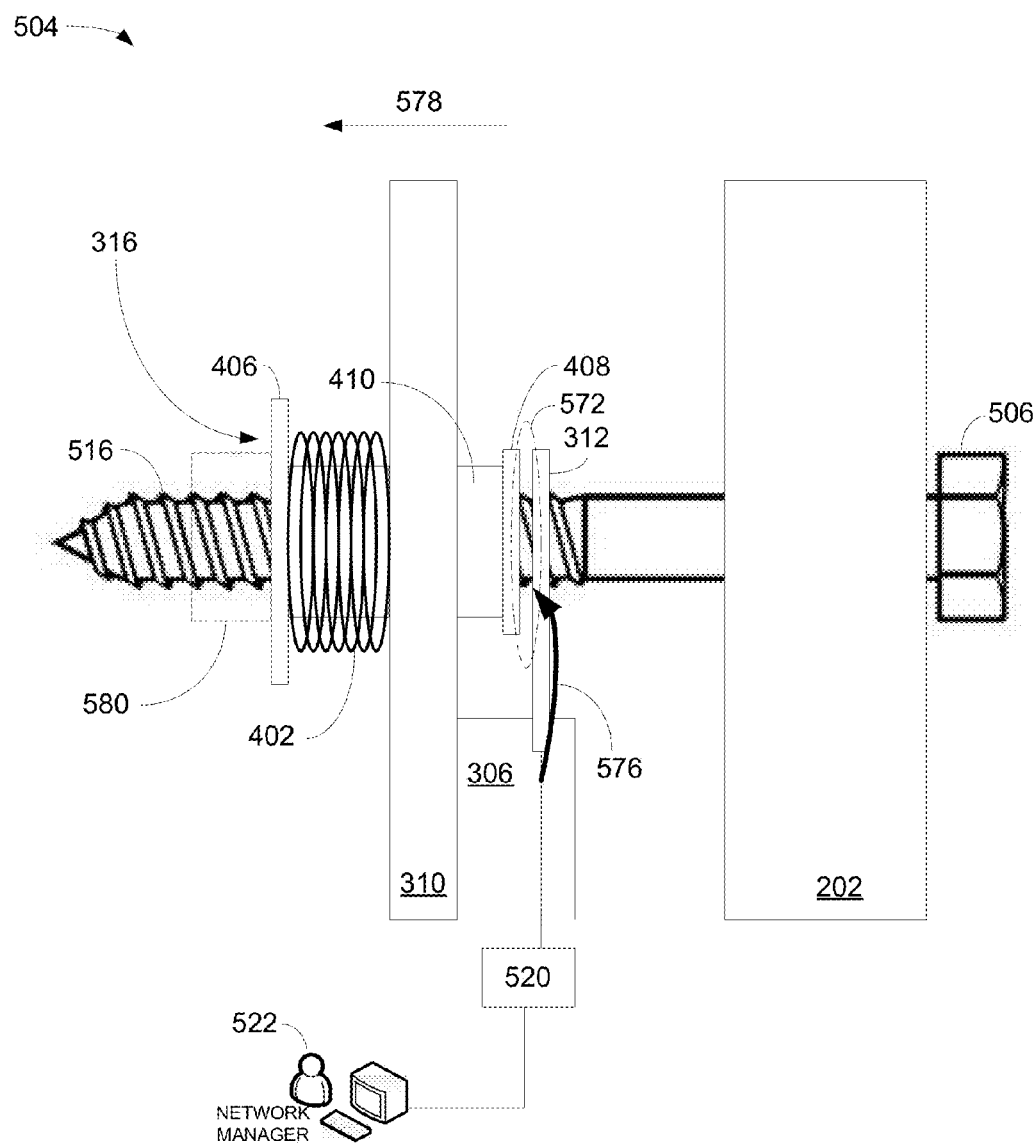

FIG. 5C is a block diagram 504 illustrating an installed NIT with an activated TWS trigger assembly in accordance with one embodiment of the present invention. Diagram 504, which is similar to diagram 500 shown in FIG. 5A, includes user 522, network device 520, faceplate 202, and NIT body. In one embodiment, the TWS trigger assembly, includes intrusion shrapnel 316, intrusion plate 312, elastic element 402, frame 310, and bolt 506. In one embodiment, a locknut 580 is used to engage with bolt 506 to assemble intrusion shrapnel 316 and intrusion plate 312 for device tampering detection.

When bolt 506 is turned in a disassembling direction such as counterclockwise direction (as shown in FIG. 5C), intrusion shrapnel 316 moves in a direction indicated by arrow 578 as bolt 506 turns. As intrusion shrapnel 316 moves in a direction indicated by arrow 578, it moves away from frame 310 or faceplate 202 as spring 402 pushes first disc 406 against frame 310. Once bolt 506 reaches at disengaging position, second disc 408 separates from intrusion plate 312 as indicated by numeral 572. When disc 408 and intrusion plate 312 are disengaged or separated, current 576 stops flowing from intrusion plate 312 to intrusion shrapnel 316. Upon detecting the stoppage of current flow 576, intrusion triggering circuitry issues an alert or warning signal to user or administrator warning unauthorized tampering. In one embodiment, all network traffic routing through NIT is stopped to prevent loss of information.

An advantage of deploying NIT with TWS trigger assembly is that it issues a warning or alert signal as soon as the intrusion shrapnel 316 loses electrical contact with intrusion plate 312. Note that loss electrical contact between intrusion shrapnel 316 and intrusion plate 312 generally happens well before the tampering steps of removal of faceplate 202 from NIT body 204.

Figure 6:
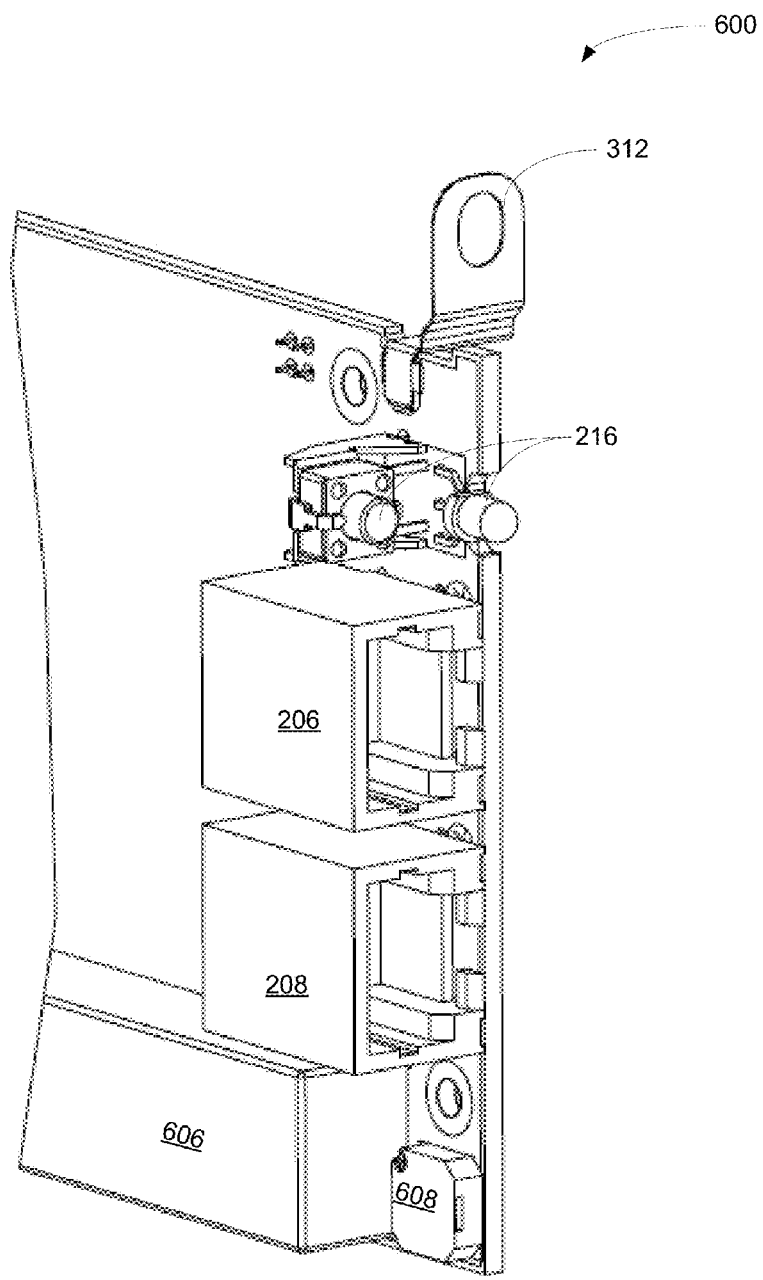
FIG. 6 illustrates an exemplary PCB having an instruction plate in accordance with one embodiment of the present invention.

FIG. 6 illustrates an exemplary PCB 600 that has an intrusion plate 312 in accordance with one embodiment of the present invention. PCB 600 includes intrusion plate 312, optical chip 606, and alarm device 608. In one aspect, PCB 600 further includes other functional chips, such as, but not limited to, a network circuitry chip and an intrusion triggering chip. PCB 600, in one example, also includes Ethernet sockets 206-208 capable of receiving Ethernet plugs to facilitate network communication. It should be noted that the underlying concept of the exemplary embodiment(s) of the present invention would not change if one or more elements (or chips) were added to or removed from PCB 600.

The network circuitry chip, not shown in FIG. 6, includes optical to electrical and electrical to optical converter(s). Upon receipt of electrical signals via sockets 206-208, electrical to optical signal converter in the chip is used to translate electrical signals into optical signals. After conversion, the optical signals are forwarded to optical chip 606. Optical chip 606 includes optical sockets, not shown in FIG. 6, capable of transmitting optical signals to a connected ODN. Similarly, after receipt of optical signals from a connected ODN via one or more optical cables connected to optical chip 606, optical to electrical signal converter in chip is used to convert optical signals to electrical signals. After conversion, the electrical signals are forwarded to their destination via Ethernet cables connected to sockets 206 or 208. In one aspect, the network circuitry on PCB 600 is configured to perform ONT functions.

The intrusion triggering chip, in one embodiment, includes intrusion triggering circuitry capable of detecting a tampering or intrusion activity. For example, upon detecting a stoppage of a current flow through intrusion plate 312, intrusion triggering circuitry issues a warning signal to a user. Alternatively, intrusion triggering circuitry can also activate alarm device 608 to sound the alarm. It should be noted that the current flows from power supply such as Vcc to ground via intrusion plate 312 and frame/chassis of NIT. Additional chip (s) may be added to PCB 600 to perform other network related functions.

Intrusion plate 312, in one example, can be soldered or fastened to PCB 600 directly or indirectly. Intrusion plate 312 is made with bendable electrical conductive material, such as metal, alloy, copper, steel use stainless ("SUS"), and the like. Note that the shape of intrusion plate 312 can be altered or bent with a predefined angle(s) which could allow intrusion plate 312 to sway within a limited distance to make electrical contact.

Figure 7:
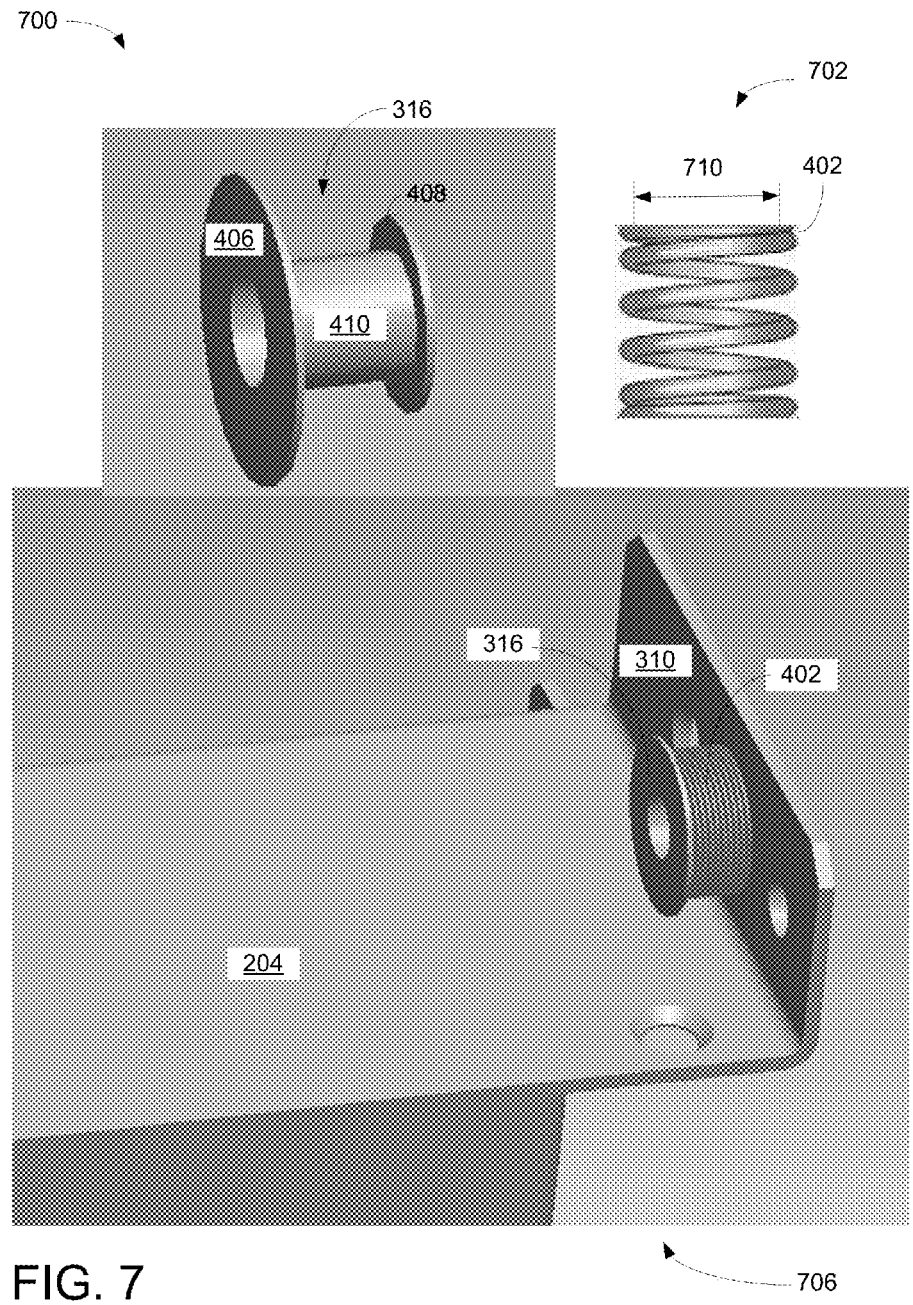
FIG. 7 illustrates several computer-aided design ("CAD") drawings showing exemplary shrapnel and spring used in NIT in accordance with one embodiment of the present invention.

FIG. 7 illustrates several computer-aided design ("CAD") drawings showing exemplary shrapnel and spring used in NIT in accordance with one embodiment of the present invention. Diagram 700 illustrates intrusion shrapnel 316 which has first disc 406, second disc 408, and cylindrical body 410. Diagram 702 illustrates a spring 402 with a diameter 710. Diameter 710 of spring 402, in one aspect, should be larger than the diameter of cylindrical body 410 but smaller than the diameter of disc 406. Spring 402 can be fabricated with various elastic materials having a predefined elasticity requirement. In one example, the elasticity requirement of spring 402 may be between 4.2 millimeter ("mm") as uncompressed and 1.6 mm as compressed. Diagram 706 illustrates a CAD drawing showing intrusion shrapnel 316 anchoring to frame 310 with spring 402 situated between disc 406 and frame 310. Note that frame 310 can be part of NIT body or chassis 204.

Figure 8:
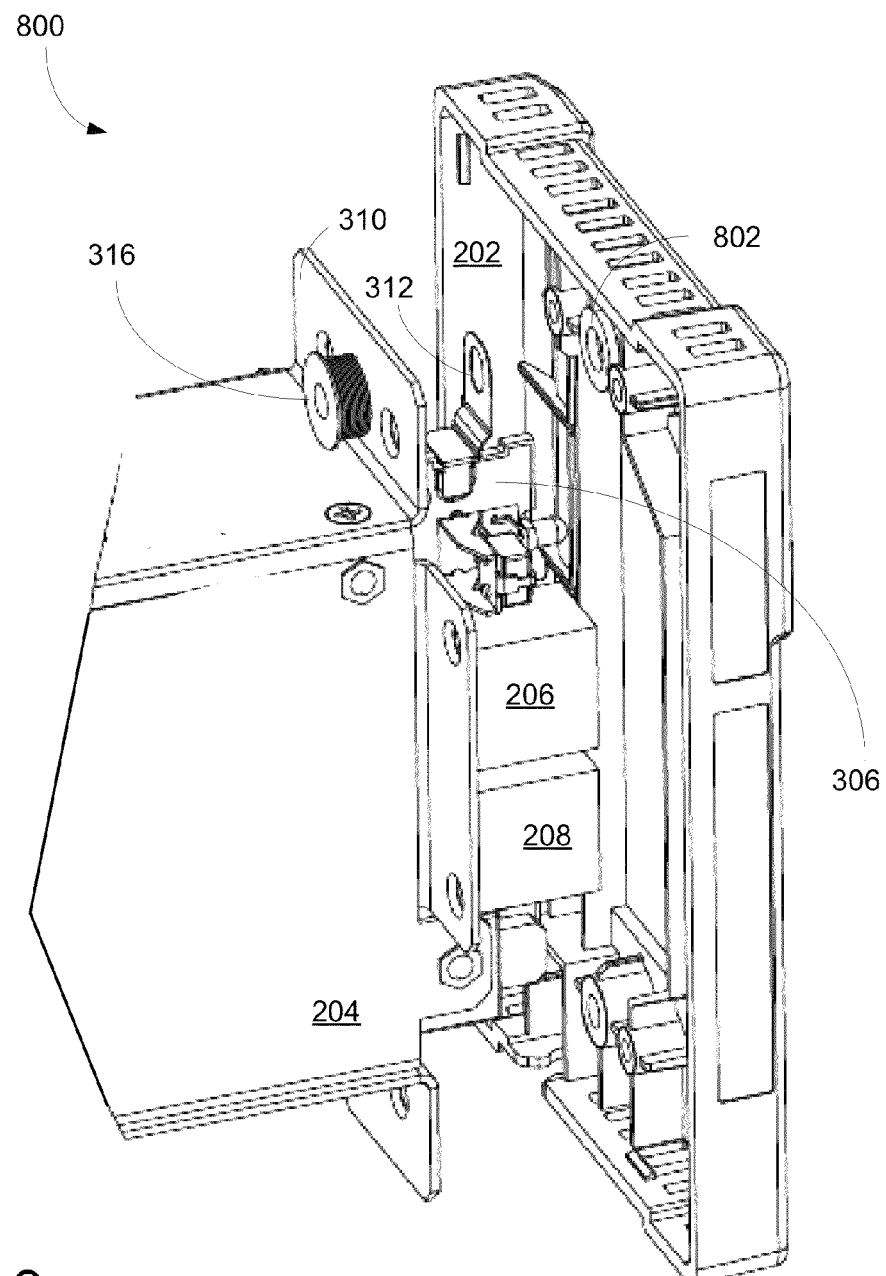
FIG. 8 is a CAD diagram illustrating an assembly of NIT including an optical coupling component in accordance with one embodiment of the present invention.

FIG. 8 is a CAD diagram illustrating an assembly of NIT 800 including an optical coupling component in accordance with one embodiment of the present invention. NIT 800 is similar to NIT 300 shown in FIG. 3 except that NIT 800 further includes optical plug, optical fiber, and washer 802. Note that optical plug and optical fiber are not shown in NIT 800, but they can be placed anywhere within NIT 800. Washer 802 may be made of rubber which is used to block or protect intrusion plate 312. Washer 802, in one aspect, also offers a buffer which provides flexibility for NIT to couple with different hand boxes or stud boxes. While washer 802 may be used as part of fastening mechanism, washer 802 also facilitates efficient contact between intrusion plate 312 and intrusion shrapnel 316.

Optical plug, in one aspect, is coupled to optical fiber wherein the fiber may be further coupled to a connected optical device, such as ODN, PON, or OLT. The optical plug is used to couple to an optical chip for transmitting optical signals between NIT 800 and ODN or PON. It should be noted that the underlying concept of the exemplary embodiment(s) of the present invention would not change if one or more elements were added to or removed from NIT 800.

Figure 9:
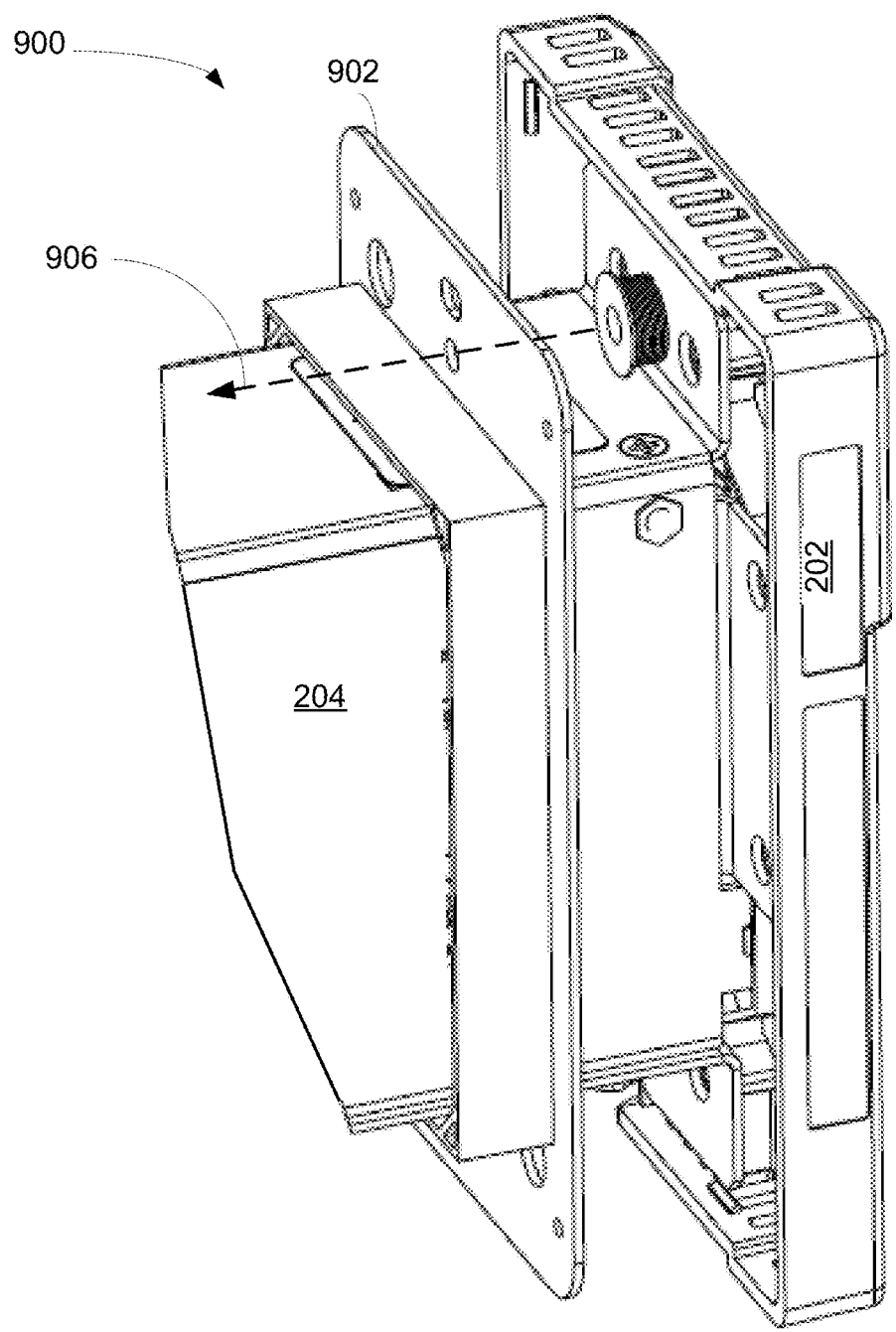
FIG. 9 is a diagram illustrating an NIT coupled to a handy box in accordance with one embodiment of the present invention.

FIG. 9 is a diagram 900 illustrating an NIT coupled to a handy box 902 in accordance with one embodiment of the present invention. Handy box 902, also known as stud box, can be attached to a stud in a wall or cubicle raceway. After handy box 902 is installed which could be done during the building construction, NIT is subsequently anchored to handy box 902. As indicated by arrow 906, a bolt can be inserted from the hole of faceplate 202 travelling through intrusion plate and intrusion shrapnel and engages with handy box 902 to secure NIT to handy box 902. When NIT is anchored to handy box 902 by turning the bolt, TWS triggering system is activated at the same or similar time.

In operation, when NIT is installed to handy box 902 by fastening the bolts and/or screws on faceplate 202, a surface of the intrusion shrapnel begins to contact or touch a part of handy box 902 and the spring around the intrusion shrapnel begins to be compressed. As NIT moves closer to handy box 902 as bolts are turning, another surface of intrusion shrapnel begins to make contact with the intrusion plate as faceplate 202 continues to move closer to NIT body. The tampering warning circuit or TWS triggering system detects a current flow with a low electrical level, no alarm will be triggered. However, when someone wants to intrude or tamper with NIT, the bolts or screws begin to unfasten. When the intrusion shrapnel begins to separate from the handy box 902, the spring begins to push the intrusion shrapnel away from the intrusion plate. Once the intrusion shrapnel separates from the intrusion plate, TWS triggering system detects a current with electrical level transforming from low to high, the alarm will sound audible alert in response to the separation between intrusion plate and intrusion shrapnel.

Figure 10:
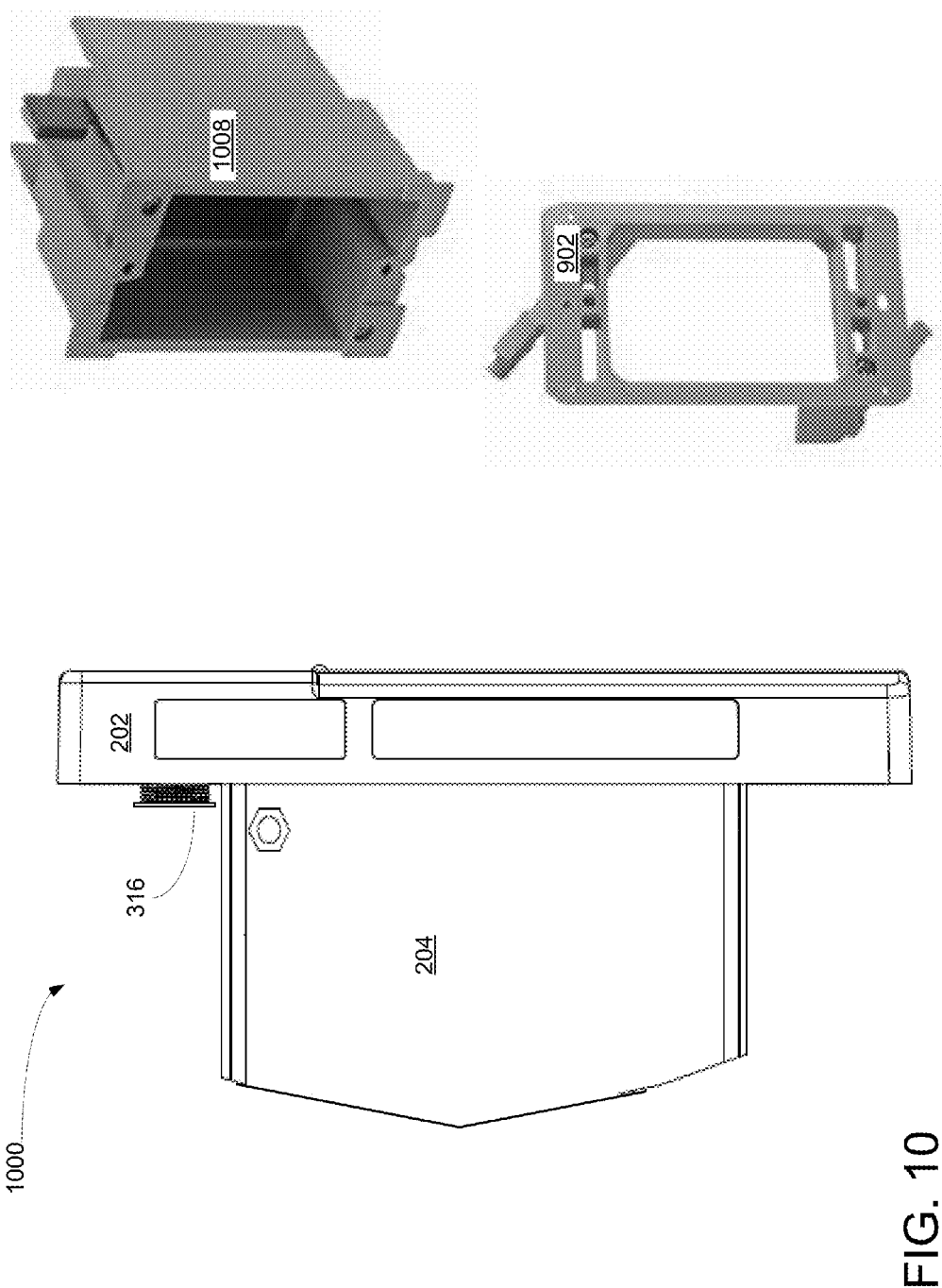
FIG. 10 is a diagram illustrating a side view of NIT and handy box(s) including an optical coupling component in accordance with one embodiment of the present invention.

FIG. 10 is a diagram 1000 illustrating a side view of NIT and handy box(s) including an optical coupling component in accordance with one embodiment of the present invention. Diagram 1000 illustrates an alternative design of handy box 1008 which is similar to the standard size of stud box for electrical wiring. Handy box 902 and 1008 can be installed and pre-wired during the construction of a building. In one aspect, handy box 902 and/or 1008 provides access to optical communications network.

During an operation, as NIT slides into handy box 902 or 1008, handy box 1008, in one example, touches intrusion shrapnel 316 and begins to compress the spring over intrusion shrapnel 316. The other side of intrusion shrapnel 316 touches the intrusion plate soldered on the PCB. TWS triggering system detects logic "on" status. Note that handy box, in one example, is a metal box that provides a grounding voltage. When someone wants to tamper with NIT, such as stealing or pulling NIT out of handy box 1008 by unscrew the bolts, the spring force generated by the compressed spring pulls intrusion shrapnel 316 away from the intrusion plate. Once the intrusion plate is electrically disconnected from intrusion shrapnel 316, TWS triggering system detects logic "off" status. Alternatively, the audible alarm is sounded when the logic "off" status is detected.

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of the exemplary embodiment of the present invention. While embodiments of the present invention will be described with reference to the Internet, the method and apparatus described herein is equally applicable to other network infrastructures or other data communications environments.

Figure 11:
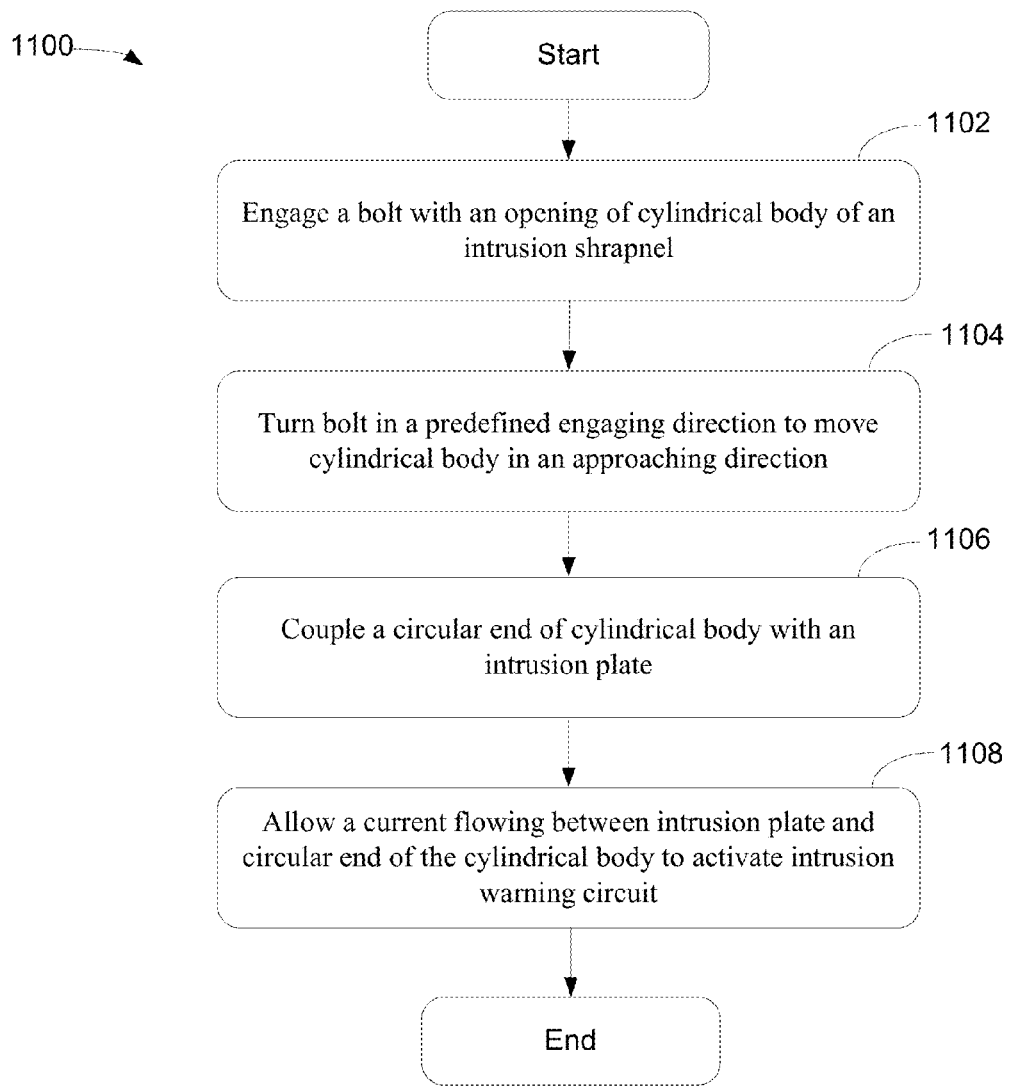
FIG. 11 is a flowchart illustrating a tampering detecting process for NIT in accordance with one embodiment of the present invention.

FIG. 11 is a flowchart 1100 illustrating a tampering detecting process for NIT in accordance with one embodiment of the present invention. At block 1102, a process capable of activating an intrusion warning system in an optical network interface device ("NID") engages a bolt with an opening of cylindrical body of intrusion shrapnel through a faceplate of the optical NID. In one example, after aligning the bolt opening on front surface of the faceplate with the opening of the cylindrical body, the bolt is inserted through the bolt opening, center hole of intrusion plate, and the opening of cylindrical body. In one aspect, the process is able to couple the thread on the surface of bolt with the helical ridge thread around the wall of the opening of cylindrical body.

At block 1104, the bolt is turned in a predefined engaging direction which will cause the cylindrical body of intrusion shrapnel to move in an approaching direction. For example, the bolt is turned in a clockwise direction. While the bolt is turning, the intrusion shrapnel moves toward to the faceplate in response to the turning motion.

At block 1106, a circular end of the cylindrical body is coupled with an intrusion plate which is connected to an intrusion warning circuit on a PCB. Note that intrusion warning circuit is also known as TWS triggering system. The circular end of cylindrical body and the intrusion plate begin to form an electrical contact as the intrusion shrapnel moves in the approaching direction.

At block 1108, the process is capable of allowing a current to flow between the intrusion plate and the circular end of the cylindrical body and activating the intrusion warning circuit. For example, the current flows from the intrusion plate to the circular end, and then the current exits for grounding via the frame of optical NID. The process is further able to receive inputs from a local communications network and subsequently forwards the inputs to the optical NID for accessing the optical communications network.

During a triggering process, after releasing the bolt in a predefined disengaging direction to move the cylindrical body of the intrusion shrapnel by turning the bolt in a disengaging direction, the cylindrical body of the intrusion shrapnel is pulled away from an intrusion plate as the cylindrical body continues to move in the predefined disengaging or retreating direction. After discounting the circular end of the cylindrical body from the intrusion plate which is connected to an intrusion warning circuit, a current flowing between the intrusion plate and the circular end of the cylindrical body for triggering the intrusion warning circuit is stopped or prevented. It should be noted that the intrusion shrapnel is capable of moving away from the faceplate.

While particular embodiments of the present invention have been shown and described, it will be obvious to those skilled in the art that, based upon the teachings herein, changes and modifications may be made without departing from this exemplary embodiment(s) of the invention and its broader aspects. Therefore, the appended claims are intended to encompass within their scope all such changes and modifications as are within the true spirit and scope of this exemplary embodiment(s) of the invention.

What is claimed is:

1. A network coupling device, comprising:
   an intrusion shrapnel having a cylindrical body with an opening through center of the cylindrical body, a first end of the cylindrical body attached to a first disc and a second end of the cylindrical body attached to a second disc;
   an elastic element situated between the first disc and a frame allowing the intrusion shrapnel to move within a limited distance, wherein the elastic element is a spring configured to fit at least a portion of exterior of the cylindrical body wherein one end of the spring pushes against the frame and another end of the spring pushes against the first disc;
   an intrusion plate electrically coupled to a printed circuit board ("PCB") and situated adjacent to the second disc; and
   a bolt having a helical ridge thread able to pass through the open of the cylindrical body via a faceplate, the faceplate configured to have an Ethernet socket configured to receive an Ethernet cable, wherein the intrusion plate and the second disc are electrically connected in response to movement of the bolt.

2. The device of claim 1, further comprising a faceplate having at least one hole for receiving the bolt.

3. The device of claim 2, further comprising an optical cable configured to transmit optical signals and configured to couple to the PCB.

4. The device of claim 1, wherein the opening of the cylindrical body includes a helical ridge thread that coincide the helical ridge thread on the bolt.

5. The device of claim 1,
   wherein the first disc is configured to couple with the spring; and
   wherein the second disc is configured to make electrical contact with the intrusion plate.

6. The device of claim 1, wherein the PCB includes network circuitry configured to convert between optical signals and electrical signals.

7. The device of claim 6, wherein the PCB includes intrusion triggering circuitry configured to issue an alert signal when the second disc disengages from the intrusion plate.

8. The device of claim 1, wherein the second disc engages with the intrusion plate allowing a current flowing from the intrusion plate to the second disc when the bolt is in a tightened position which causes the first disc moves closer to the frame.

9. The device of claim 2, wherein the second disc disengages from the intrusion plate when the bolt is in a released position which causes the first disc moves away from the frame in response to spring force generated by the elastic element.

10. A network coupling device, comprising:
    a network interface terminal ("NIT") body configured to house a printed circuit board ("PCB") and for facilitating optical network communication;
    a faceplate coupled to the NIT body via a bolt and configured to have an Ethernet socket configured to host an Ethernet cable; and
    a terminal warning system ("TWS") trigger assembly coupled to the faceplate and configured to detect device tempering relating to the faceplate, wherein the TWS trigger assembly includes:
    an intrusion shrapnel having a first disc and a second disc;
    a spring situated between the first disc and a frame of the NIT body limiting movement of the intrusion shrapnel;
    an intrusion plate electrically coupled to the PCB and situated adjacent to the second disc,
        wherein the intrusion plate and the second disc are electrically connected in response to movement of the bolt.

11. The device of claim 10, wherein the intrusion shrapnel is configured to have a cylindrical body with an opening through center of the cylindrical body, a first end of the cylindrical body attached to the first disc and a second end of the cylindrical body attached to the second disc.

12. The device of claim 11, wherein the bolt having a helical ridge thread able to pass through the opening of the intrusion shrapnel.

13. The device of claim 10, wherein the faceplate has at least one hole for receiving the bolt.

14. The device of claim 10, wherein the PCB containing at least one integrated circuit chip is configured to transmit information between the optical network communication and Ethernet via the Ethernet socket of the faceplate.

15. The device of claim 14, wherein the PCB includes network circuitry configured to convert between optical signals and electrical signals.

16. The device of claim 10, wherein the PCB includes intrusion triggering circuitry configured to issue an alert signal when the second disc disengages from the intrusion plate.

17. A stationary network coupling device, comprising:
    a network interface terminal ("NIT") body configured to house a printed circuit board ("PCB") for processing optical and electrical signals;
    a faceplate coupled to the NIT body via a bolt and configured to have an Ethernet socket configured to receive an Ethernet cable; and
    a terminal warning system ("TWS") trigger assembly coupled to the faceplate and configured to detect a disengagement of the faceplate from the NIT body through an interruption of a current flow between the TWS trigger assembly and the PCB, wherein the TWS trigger assembly includes:
    an intrusion shrapnel having a cylindrical body with an opening through center of the cylindrical body, a first end of the cylindrical body attached to a first disc and a second end of the cylindrical body attached to a second disc;

a spring situated between the first disc and a frame allowing the intrusion shrapnel to move within a limited distance; and an intrusion plate electrically coupled to the PCB and situated adjacent to the second disc, wherein the bolt having a helical ridge thread able to pass through the open of the cylindrical body, wherein the intrusion plate and the second disc are electrically connected in response to movement of the bolt.

* * * * *